[United States Patent Office — 3,238,251 — Patented Mar. 1, 1966]

3,238,251
PRODUCTION OF SUBSTITUTED NAPHTHALENE DERIVATIVES BY REARRANGEMENT OF SUBSTITUTED DICYCLOPENTADIENE DERIVATIVES WITH A FRIEDEL-CRAFTS CATALYST
Harry Douglas Williams, Penns Grove, N.J., assignor to E. I. du Pont de Nemours and Company, Wilmington, Del., a corporation of Delaware
No Drawing. Filed Dec. 20, 1961, Ser. No. 160,954
7 Claims. (Cl. 260—514)

The present invention relates to a process for the manufacture of substituted naphthalene derivatives from substituted dicyclopentadiene derivatives.

Naphthalene and its derivatives are important intermediates in the chemical industry. Such naphthalenes as $\alpha$-naphthol, $\beta$-naphthol, $\alpha$-naphthylamine, $\beta$-naphthylamine, $\alpha$-naphthalenesulfonic acid, $\beta$-naphthalenesulfonic acid, 2,7-naphthalenedisulfonic acid, and 2,6-naphthalenedisulfonic acid are used extensively by the dye industry. Dimethylnaphthalenes can be oxidized to naphthalenedicarboxylic acids, which are valuable intermediates for making polyesters suitable for synthetic fibers. However, the present processes for making naphthalene derivatives are unsatisfactory in certain respects. The distribution of isomers in substitution reactions of naphthalene is often unfavorable. Additionally, the sources of naphthalene derivatives are somewhat undependable because of the tremendous demand for naphthalene for oxidation to phthalic anhydride.

During the course of catalytic reforming reactions in the petroleum industry, substantial quantities of dicyclopentadiene, alkyl substituted dicyclopentadienes, and its derivatives are concurrently made and to date no large scale uses have been found for them; however, in accordance with the present invention, substituted naphthalenes are prepared by the rearrangement of a substituted dicyclopentadiene by contacting such substituted dicyclopentadiene with a Friedel-Crafts catalyst.

The basic naphthalene ring has a $C_{10}$ structure. Dicyclopentadiene also has a $C_{10}$ structure and by rearrangement under the conditions of the present invention can be converted to the naphthalene structure. The double bonds of dicyclopentadiene readily add other elements and radicals to give mono-, di-, tri-, or tetrasubstituted derivatives. The two double bonds are unequal in reactivity so that the addition reaction can be stopped at the distage as well as carried to the completely substituted stage. Dicyclopentadiene is more systematically named as tricyclo-(5.2.1.0$^{2,6}$)-3,8-decadiene numbered as follows:

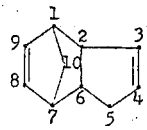

The following substituents can be added to the above central structure to give substituted dicyclopentadienes in accordance with the present invention at the position indicated: 3-amino, 4-amino, 3,9-diamino, 3,8-diamino, 4,8-diamino, 3-cyano, 4-cyano, 3,9-dicyano, 3,8-dicyano, 4,8-dicyano, 3-hydroxy, 4-hydroxy, 3,8-dihydroxy, 3,9-dihydroxy, 4,8-dihydroxy, 3,4,8,9-tetrahydroxy, 3-carboxy, 4-carboxy, 3,8-dicarboxy, 3,9-dicarboxy, 4,8-dicarboxy, 4-methyl, 3-methyl, 3,8-dimethyl, 3,9-dimethyl, 4,8-dimethyl and hydrogenated derivatives of the above.

The above substituted dicyclopentadienes can be rearranged by the process of the present invention to give correspondingly substituted naphthalene derivatives such as amino naphthalenes, cyanonaphthalenes, carboxy naphthalenes, methyl naphthalenes, hydroxynaphthalenes and/or their hydrogenated or partially hydrogenated derivatives. By "correspondingly substituted," it is meant that the substituents on the naphthalene derivatives are identical in kind to those on the dicyclopentadiene reactant.

The Friedel-Crafts catalysts usable in the practice of this invention include $AlCl_3$, HF, $BF_3$, mixtures of HF and $BF_3$ in any proportion, $AlBr_3$, $ZnCl_2$, $SbCl_3$, $FeCl_3$, acidic silica-alumina boria-alumina and many others. The preferred catalysts are HF, $BF_3$, mixtures of HF and $BF_3$ in any proportion, $AlCl_3$ and acidic silica-alumina. The silica-alumina used contains from 10 to 50% $Al_2O_3$, the remainder being silica. Suitable silica-alumina catalysts are made by the Davison Company as SMR-55-7254 and D-980 and by the Houdry Company as S-65.

The temperatures used for the rearrangement depend on the temperature at which the particular catalyst used is active. For example, the preferred range of temperature for the use of HF-$BF_3$ mixtures is about $-10°$ C. to $80°$ C. Below $-10°$ C. the reaction rate is too low to be economically attractive and above $80°$ C. considerable decomposition occurs. When $AlCl_3$ is the catalyst the preferred temperature range is from about $125°$ C. to $200°$ C. Again the lower limit is set because of slow reaction rates below $125°$ C. and excessive decomposition above $200°$ C.

When silica-alumina is the catalyst even higher temperatures must be used because of the relatively low activity of this material as a catalyst. The preferred range is from about $300°$ C. to $450°$ C. The use of silica-alumina as a catalyst is particularly suited for vapor phase reactions which require that the reactants be in the gas phase. Where reactants do not volatilize without decomposition, such as tetrahydrodicyclopentadienedicarboxylic acid, they can be converted to volatile derivatives, such as the methyl esters, for use in vapor phase reactions or the reactants can be carried over with a stream of inert gaseous diluent such as nitrogen, helium or argon. Inert gaseous diluents can also be used with volatile starting materials. Also, high melting materials can be handled in liquid phase reactions by including a liquid diluent inert in the system. Such liquids include dimethylformamide, diphenyl ether, diphenyl, diphenylmethane, and dimethylsulfoxide.

The rearrangement can be effected at atmospheric or super-atmospheric pressure. When HF, $BF_3$, or mixtures thereof are used as a catalyst the pressure will be completely determined by the vapor pressure of the catalyst at the temperature used. Super-atmospheric pressure is of no advantage in the reaction except as it may be necessary to contain the catalyst within the reaction vessel or to increase the space-time yield. Using HF, $BF_3$ or mixtures thereof as the catalyst, the pressure will normally be below 100 atmospheres. The ratio of catalyst to material being rearranged is not at all critical. For example, in the case of HF—$BF_3$ mixtures for example, the catalyst will generally serve as the solvent for the reaction and acid will be present at as high as a 100 to 1 weight ratio to the material being rearranged; however, the quantity of catalyst should be at least 5% of the weight of the material being rearranged, if an inert diluent is used.

The reaction time will depend on the Friedel-Crafts catalyst being used and on the temperature employed. In general, the reaction is carried out until a substantial portion of the dicyclopentadiene derivative is converted to the naphthalene derivative. The product is then separated from the reaction mixture. Any unreacted starting material can be recycled to another rearrangement reaction.

Because the process of the subject invention is a rearrangement reaction no ingredients other than the material being rearranged are consumed. No products such as water are produced to dilute the main product or destroy the catalyst; therefore, the catalysts and unreacted starting materials are easily recovered by distillation and other appropriate and conventional means. In a vapor phase reaction using silica-alumina as the catalyst the catalyst will become covered with carbon and thus reduced in activity. The activity can be easily restored by passing a gas stream rich in oxygen over the catalyst at 300–500° C. to remove carbon as $CO_2$.

When HF and $BF_3$ are used as the catalyst they can be recovered easily by distillation for reuse.

$AlCl_3$ can be recovered for reuse by merely filtering it off and washing it with an inert solvent.

When tetrahydrodicyclopentadiene derivatives are rearranged at low temperatures, i.e., below 200° C., the product is an octahydronaphthalene derivative. If higher temperatures are used other reactions such as dehydrogenation can occur concurrently giving naphthalene derivatives. It is highly unlikely, although possible, that any hexahydro, tetrahydro, or dihydro derivatives of naphthalene are formed as stable intermediates in the process at temperatures above 300° C. because of the ease with which these derivatives dehydrogenate.

Although other modifications will be apparent to those skilled in the art the invention is illustrated by the following examples where parts given are by weight.

*Example 1*

A suspension of 100 parts of cyclopentadienyl sodium in 1000 parts of dry xylene is added slowly with agitation to 1000 parts of dry xylene saturated with $CO_2$ at 25° C. in a pressure vessel containing $CO_2$ at 100 p.s.i.g./ pressure. After all of the cyclopentadienyl sodium is added a stream of nitrogen is passed through the mixture to strip out the excess $CO_2$. Then 10 mole percent (based on the original sodium present) of sulfuric acid is added to the mixture along with 250 ml. of water per mole of sodium originally present. The aqueous phase is separated and acidified. The white solid which separates is filtered off and dried. It is obtained in 90% yield based on the cyclopentadienyl sodium used and melted at 205–208° C.

*Example 2*

Commercial dicyclopentadienedicarboxylic acid made as in Example 1 (25 parts), a 5% rhodium-on-activated-carbon catalyst (0.5 part) and absolute ethanol (200 parts) is placed in a pressure vessel and agitated for 4 hours at autogenous temperature under a pressure of 3 atmospheres of hydrogen. The liquid slurry is filtered to remove catalyst and the filtrate is evaporated to dryness. The remaining solid is recrystallized from 50% aqueous ethanol. The yield of tetrahydrodicyclopentadienedicarboxylic acid is 18 parts of a white powder. Infrared determinations indicate that the two double bonds have been hydrogenated.

This tetrahydro acid is placed in an autoclave with 300 parts of anhydrous HF and 150 parts of $BF_3$. Special precautions are taken to ensure that moisture is excluded from the autoclave and the starting materials. The autoclave is then pressurized to 50 atmospheres with $CO_2$ and the mixture stirred and agitated for 1 hour at 50° C. The product is then removed from the autoclave and the HF and $BF_3$ allowed to evaporate. The residue is poured into ice water. The light-colored solid is filtered off, washed with water and recrystallized from 50% aqueous ethanol. It is a very light yellow powder amounting to 14.4 parts (80% yield) melting at 227–229° C. Identification by infrared, vapor phase chromatography, elemental analysis, and neutralization equivalent shows that the product is 2,6-octahydronaphthalenedicarboxylic acid. The infrared spectrum shows the presence of one carbon-carbon double bond. The neutral equivalent of the product is 111 (theory for $C_{12}H_{16}O_4$—112). Elemental analysis shows 64.7% carbon (theory for $C_{12}H_{16}O_4$—64.25).

Hydrogenation of the product at 50° C. and 3 atmospheres hydrogen pressure using a 5% palladium-on-carbon catalyst results in the absorption of 1 mole of hydrogen per mole of product and gives decahydro-2,6-naphthalenedicarboxylic acid. Equivalent results are obtained when monocarboxy-substituted dicyclopentadiene such as 3- or 4-carboxydicyclopentadienes are used as the starting materials.

*Example 3*

The procedure of Example 2 is repeated except that the autoclave is pressurized with nitrogen instead of $CO_2$. The same product is obtained in 75% yield. Allowing the rearrangement reaction to proceed under autogenous pressure of HF and $BF_3$ gives the 2,6-octahydronaphthalenedicarboxylic acid in 70% yield.

*Example 4*

The procedure of Example 2 is repeated except that the temperature used for the rearrangement of the tetrahydrodicyclopentadienedicarboxylic acid by HF and $BF_3$ is 80° C. The yield of 2,6-octahydronaphthalenedicarboxylic acid is 65%.

*Example 5*

Commercial methylcyclopentadiene dimer (105 parts) is mixed and stirred with 1 part of a 5% rhodium-on-carbon catalyst and 150 parts diethyl ether under 3 atmospheres hydrogen pressure for 3 hours. The catalyst is then filtered off and the product distilled. The product is tetrahydrodimethyldicyclopentadiene amounting to 100 parts distilling at 95–97° C. at 16 mm.

The tetrahydro compound (40 parts) is passed the vapor state over a silica-alumina acidic catalyst (90 parts) (S–65, manufactured by Houdry Process Corp., containing 88% silica and 12% alumina) at 350° C. in 1.5 hours. The product is collected in a trap cooled in ice. It amounts to 26.5 parts. Identification of the product by gas chromatographic separation and comparison with authentic samples shows six components: naphthalene, 1-methylnaphthalene, 2 - methylnaphthalene, 1,6 - dimethylnaphthalene, 2,6-dimethylnaphthalene and 2,7-dimethylnaphthalene. The dimethylnaphthalenes amount to about 65% of the total product and 2,6-dimethylnaphthalene is the major dimethylnaphthalene present. Other acidic-alumina catalysts give equivalent results, i.e., 75% silica-25% alumina, 85% silica-15% alumina, and 50% silica-50% alumina.

*Examples 6 and 7*

The procedure of Example 5 is repeated using different temperatures for the rearrangement of forty parts of tetrahydrodimethyldicyclopentadiene. The results are summarized in the table below:

| Example | Temperature, ° C. | Percent of Organic Material Recovered [1] | Major Product |
|---|---|---|---|
| 6 | 450 | 38 | 2,6-dimethyl-naphthalene. |
| 7 | 300 | 66 | Do. |

[1] The organic material recovered represents the percentage of the weight of the original starting material recovered in altered form after passing over the catalyst and collected in the cold trap.

*Example 8*

When the procedure of Example 5 is used with the substitution of 3-methyl-, 4-methyl-, 3,8-dimethyl-, 3,9-dimethyl-, or 4,8-dimethyldicyclopentadiene for the tetrahydrodimethyldicyclopentadiene, equivalent results are obtained.

*Example 9*

Tetrahydrodicyclopentadienedicarboxylic acid (5 parts), prepared as in Example 2, is mixed with 1 part of $AlCl_3$ and 50 parts dimethylformamide in a flask. The contents of the flask are stirred and heated at reflux for 6 hours. The dimethylformamide is removed by distillation at reduced pressure and the residue poured into ice water. The solid is filtered off and recrystallized from 50% aqueous ethanol to give 3.6 parts of a light yellow solid melting at 227–229° C. Infrared spectra showed that this compound is identical to the compound obtained by rearranging tetrahydrodicyclopentadienedicarboxylic acid in HF–BF$_3$ as in Example 2 and therefore is 2,6-octahydronaphthalenedicarboxylic acid.

The invention has been illustrated by the above examples. Many equivalent modifications will be apparent to those skilled in the art without departing from the instant inventive concept, thus we wish to be limited only by the following claims.

1. A process for rearranging a compound of the group consisting of tricyclo(5.2.1.0$^{2.6}$)-3,8-decadiene and ring hydrogenated derivatives thereof, said compound being substituted in at least one of the positions 3, 4, 8 and 9 with a radical of the group consisting of —NH$_2$, —CN, —OH, —COOH and —CH$_3$, to produce a correspondingly substituted naphthalene derivative, which comprises contacting said compound with a Friedel-Crafts catalyst at a temperature of about −10° C. to 450° C.

2. The process of claim 1 wherein the catalyst is a member of the group consisting of HF, BF$_3$, a mixture HF and BF$_3$, AlCl$_3$, and acidic silica-alumina containing 10–50% Al$_2$O$_3$.

3. The process of claim 1 wherein said compound is a carboxy-substituted tetrahydrodicyclopentadiene.

4. A process for the preparation of 2,6-octahydronaphthalenedicarboxylic acid which comprises mixing tetrahydrodicyclopentadienedicarboxylic acid with a mixture of HF and BF$_3$ at a temperature of about 10° to 80° C.

5. A process for the preparation of 2,6-octahydronaphthalenedicarboxylic acid which comprises mixing tetrahydrodicyclopentadienedicarboxylic acid with aluminum chloride in an inert solvent at about 125° to 200° C.

6. The process of claim 1 wherein said compound is a methyl-substituted tetrahydrodicyclopentadiene.

7. A process for the preparation of dimethylnaphthalene which comprises passing tetrahydrodimethyldicyclopentadiene over a silica-alumina catalyst at about 300° to 450° C. and separating dimethylnaphthalene by distillation.

References Cited by the Examiner

UNITED STATES PATENTS

| | | | |
|---|---|---|---|
| 2,875,244 | 2/1959 | Bartlett et al. | 260—514 |
| 2,888,484 | 5/1959 | Dehm et al. | 260—514 |
| 2,920,114 | 1/1960 | Bloch | 260—666 |
| 2,925,447 | 2/1960 | Appell | 260—666 |
| 3,127,438 | 3/1964 | Friedman et al. | 260—468 |

OTHER REFERENCES

Cripps et al., "J. Am. Chem. Soc.," vol. 81, June 1959, pp. 2723–2728.

Nenitzescu et al., "Deutsche Chem. Gesell. Ber.," vol. 69, 1936, pp. 1040–1041.

Shuikin et al., "Chem. Abstracts," vol. 52 (1958), p. 20067.

Topchieva et al., "Chem. Abstracts," vol. 49 (1955), pp. 5318–5319.

Turova-Pollak, "Chem. Abstracts," vol. 47 (1953), pp. 12207–12208.

Turova-Pollak, "Chem. Abstracts," vol. 37 (1943), pp. 1702–1703.

LORRAINE A. WEINBERGER, *Primary Examiner.*

ALPHONSO D. SULLIVAN, *Examiner.*